United States Patent

[11] 3,543,886

[72] Inventor Roy Campbell
 Dudley, England
[21] Appl. No. 797,001
[22] Filed Feb. 6, 1969
[45] Patented Dec. 1, 1970
[73] Assignee Girling Limited
 a British Company
 Birmingham, England
[32] Priority Feb. 10, 1968
[33] Great Britain
[31] No. 6702/68

[54] DISC BRAKES
 6 Claims, 4 Drawing Figs.
[52] U.S. Cl. .................................................. 188/71.4,
 188/72.2, 192/70
[51] Int. Cl. ..................................................... F16d 55/04
[50] Field of Search .......................................... 188/72(A),
 (S); 192/70

[56] References Cited
UNITED STATES PATENTS
3,239,033 3/1966 Walker ........................ 188/72(S)UX FOREIGN PATENTS
949,863 2/1964 Great Britain ................ 188/72(A)UX Primary Examiner—George E. A. Halvosa
Attorney—Scrivener, Parker, Scrivener and Clarke ABSTRACT: In a disc brake of the kind comprising a stationary housing, axially spaced braking surfaces in the housing, a shaft extending axially within the housing, axially spaced brake discs slidably keyed on said shaft for engagement with said brake surfaces in the housing, cooperating pressure plates located between said brake discs, angularly spaced balls located in a complementary inclined recess in the adjacent faces of said pressure plates, means for moving said pressure plates angularly in opposite directions to initiate the application of the brake, and a plurality of angularly spaced pilot lugs extending radially inwards from said housing for centralizing said pressure plates with respect to the axis of the brake, an insert is mounted for rocking movement in the radially innermost face of at least one pilot lug and is adapted to be engaged by one or both pressure plates in the application of the brake.

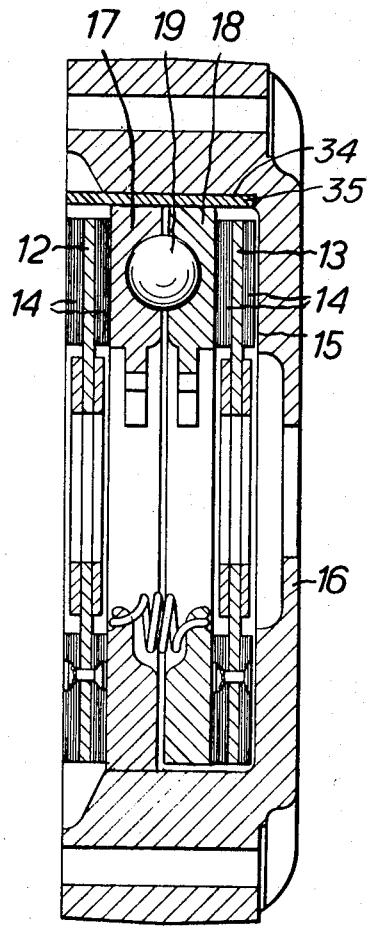
Fig. 2
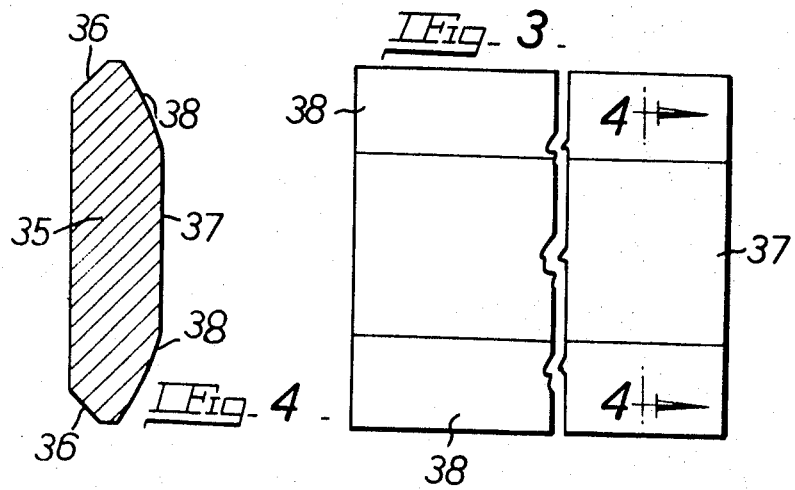
Fig. 3
Fig. 4

DISC BRAKES

This invention relates to improvements in disc brakes of the kind in which relatively stationary and rotatable surfaces are brought into frictional engagement by axial separation of a pair of cooperating pressure plates between which are arranged angularly spaced balls working in complementary inclined recesses in the adjacent surfaces of the plates, the application of the brake being initiated by moving the plates angularly in opposite directions.

In the usual brake of this kind the rotatable surfaces are formed by or on discs splined or otherwise keyed for axial sliding movement on a rotatable shaft, and the stationary surfaces are formed by the end walls of a housing enclosing the discs and pressure plates.

The pressure plates are centralized by angularly spaced pilot lugs projecting inwardly from the housing, and after the initial angular movement of the pressure plates in opposite directions the plates are carried round with the rotating discs until a projecting lug on one plate engages an abutment face on a pilot lug which arrests its movement while the other plate continues to move angularly whereby the plates are urged apart in an axial direction to apply the brake.

With this type of brake it has been found that in the application of the brake the force applied to the actuator by which the initial angular movement of the pressure plates in opposite directions is effected has to be built up to a certain value before the pressure plates slide angularly over a pilot lug and start the servoaction of the pressure plates.

It is believed that this effect is probably due to the fact that with tolerance variations part of the periphery or crown portion of a pressure plate is of greater radius than the edge of the pilot lug with which it first engages so that the plate has to move transversely away from the lug before it can clear that edge.

According to our invention the difficulty referred to above is overcome or at least its effect is materially reduced by providing in the radially innermost face of at least one pilot lug an insert with which the peripheral edge of a pressure plate or each pressure plate is adapted to engage in the application of the brake and which is so mounted in the pilot lug that it is free to aline itself automatically with the periphery of the pressure plate.

The insert is conveniently mounted in a part-circular or part-spherical recess in the radially innermost face of the pilot lug in which it can rock, the insert having a complementary arcuate or part-spherical face cooperating with the recess and a substantially flat face for engagement by a pressure plate or by both pressure plates.

Normally only one of the pressure plates is in sliding engagement with the insert in the pilot lug, this being the plate which continues its angular movement after the other or stationary plate has been arrested and provides the servoaction, but in some constructions the stationary plate or both plates may be in engagement with the insert.

One practical embodiment of our invention is illustrated by way of example in the accompanying drawings in which:

FIG. 2 is a section on the line 2-2 of FIG. 1;

FIG. 3 is a rear view of an enlarged scale of an insert for a pilot lug; and

FIG. 4 is a corresponding section of the insert on the line 4-4 of FIG. 3.

Figure 1:
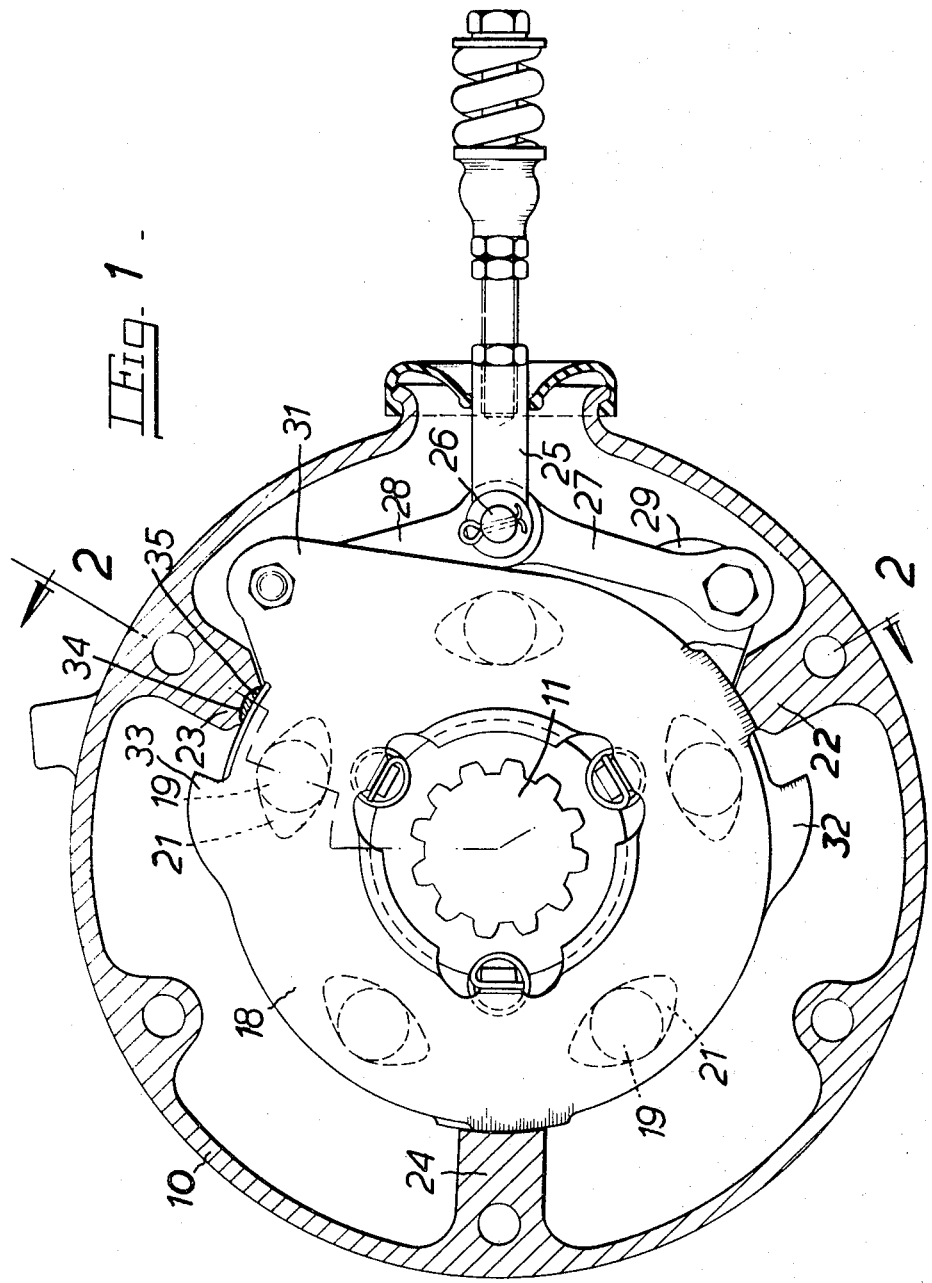
FIG. 1 is an end view of a brake of the kind set forth with the end cover of the housing removed.

In the brake illustrated 10 is the stationary brake housing. A rotatable shaft 11 extends axially through the housing, and within the housing two brake discs 12, 13 are splined on the shaft for axial sliding movement thereon. Each disc carries rings 14 of friction material on each of its faces. The discs are adapted to be urged apart to bring them into engagement with radial surfaces on the stationary housing. One surface 15 is formed on the integral end wall 16 of the housing and the other is formed on a detachable cover or end plate (not shown) for the other end of the housing. The separation of the discs is effected by two cooperating pressure plates 17, 18 located between the discs. Balls 19 are located in complementary inclined recesses 21 in the adjacent faces of the pressure plates so that on relative angular movement between the plates they are urged apart to force the brake discs into engagement with the stationary braking surfaces on the housing.

The pressure plates are centralized by three angularly spaced pilot lugs 22, 23, 24 which project radially inwardly from the peripheral wall of the housing.

The application of the brake is initiated by moving the pressure plates angularly in opposite directions. This is effected by a pull on an actuating rod 25 pivotally connected to a pin 26 coupling together the inner ends of two toggle links 27, 28 of which the outer ends are pivotally connected to radially projecting lugs 29, 31 on the respective pressure plates.

The frictional engagement of the pressure plates with the brake discs causes the plates to be carried round with the discs until, depending on the direction of rotation of the discs, a stop lug 32 on the plate 17 engages the pilot lug 22, or a stop lug 33 on the plate 18 engages the pilot lug 23. Further angular movement of one pressure plate is thus arrested while angular movement of the other pressure plate continues and a servoaction is produced which applies the brake.

This is a well-known type of brake.

Normally the radially innermost faces of the pilot lugs are part cylindrical, being parts of a cylindrical surface of a diameter slightly greater than the diameter of the pressure plates.

According to our invention a part-circular recess 34 is milled in the radially innermost surface of at least one of the lugs, in this case the lug 23. The recess has located in it an insert 35 having an arcuate outer face of the same radius as the bottom of the recess and a flat or substantially flat inner face for engagement by the peripheral edge of a pressure plate.

As the insert is free to rock in the recess 34 it can automatically aline itself with the portion of the periphery of the pressure plate which engages it, whatever may be the radius of that portion with tolerance variations.

The ends of the insert 35 may be chamfered off as shown at 36 in FIG. 4 and the circumferential length of the insert between the chamfered ends is less than the minimum spacing in a circumferential direction between the adjacent parts of the opposed faces of the pilot lug to ensure that no abutment loads can be taken by the insert.

The arcuate outer face of the insert may have a central flat as shown at 37 in FIG. 4 so that only the parts 38 adjacent to opposite ends are in angular sliding engagement with the part-circular bottom of the recess 34 in the pilot lug.

The length of the insert in the direction of the axis of the brake may be such that it can be engaged by both pressure plates or by only one of the pressure plates.

In a modification the recess in the pilot lug may be part spherical in which case the radially outer face of the insert will be of complementary contour.

In the drawings an insert is shown only in the pilot lug 23 but a similar insert may be provided in the lug 22, the lugs 22 and 23 being those adjacent to the actuating means 25, 27, 28 by which the pressure plates are moved angularly in opposite directions to initiate the application of the brake.

The pilot lug 23 is the one which is first engaged by a pressure plate or by both pressure plates in the normal direction of rotation of the brake discs while the pilot lug 22 is the one which is first engaged when the discs are rotating in the reverse direction.

The insert may be formed of any suitable material. Preferably it is formed of a metal or alloy having a low coefficient of friction so that frictional resistance to movement of a pressure plate relative to the insert is reduced to a minimum. Alternatively the insert can be made of a very hard material so that any wear which takes place is on the pressure plate or plates rather than on the insert.

I claim:

1. A disc brake comprising a stationary housing, axially spaced braking surfaces in the housing, a shaft extending axially within the housing, axially spaced brake discs slidably keyed on said shaft for engagement with said brake surfaces in the housing, cooperating pressure plates located between said brake discs, angularly spaced balls located in complementary inclined recesses in the adjacent faces of said pressure plates, means for moving said pressure plates angularly in opposite directions to initiate the application of the brake, and a plurality of angularly spaced pilot lugs extending radially inwards from said housing for centralizing said pressure plates with respect to the axis of the brake, wherein the improvement comprises a self-alining insert mounted for rocking movement in the radially innermost face of at least one of said pilot lugs and adapted to be engaged by one or both pressure plates in the application of the brake, said insert having a substantially flat radially innermost face tangentially engageable by a pressure plate, said pilot lug having a part-circular recess in its radially innermost face to receive the radially outermost face of said insert, said outermost face being arcuate and of substantially the same radius as said recess so that said insert is rockable within said recess.

2. A disc brake as in claim 1, wherein the radially outermost face comprises a substantially flat central portion between two arcuate portions of substantially the same radius as the recess in which it is mounted.

3. A disc brake as in claim 1, wherein the recess is part spherical and the radially outermost face of the insert is part spherical and of the same radius as the recess.

4. A disc brake as in claim 1, wherein the ends of the insert are chamfered and the overall length of the insert in a circumferential direction is less than that of the adjacent part of the pilot lug in which it is mounted.

5. A disc brake as in claim 1, wherein the insert is formed of a metal or alloy having a low coefficient of friction.

6. A disc brake as in claim 1, wherein an insert is mounted in each of two pilot lugs with which a pressure plate or each pressure plate first engages when the brake discs are rotating in the normal forward direction and in the reverse direction respectively.